US012540488B2

(12) United States Patent
Shemer et al.

(10) Patent No.: US 12,540,488 B2
(45) Date of Patent: Feb. 3, 2026

(54) METHODS, SYSTEMS AND MANACLING APPARATUSES FOR RESTRAINING INDIVIDUALS

(71) Applicants: Amir Shemer, Shaar Shomron (IL); Ariel Schwarz, Sdot Micha (IL)

(72) Inventors: Amir Shemer, Shaar Shomron (IL); Ariel Schwarz, Sdot Micha (IL); Alon Schwarz, Jerusalem (IL); Yitzhak Ovadya, Jerusalem (IL); Yossef Danan, Rehovot (IL); Lior Shemesh, Alfei Menashe (IL)

(73) Assignees: Amir Shemer, Shaar Shomron (IL); Ariel Schwarz, Sdot Micha (IL)

(*) Notice: Subject to any disclaimer, the term of this patent is extended or adjusted under 35 U.S.C. 154(b) by 181 days.

(21) Appl. No.: 18/551,608

(22) PCT Filed: Mar. 24, 2022

(86) PCT No.: PCT/IB2022/052686
§ 371 (c)(1),
(2) Date: Sep. 21, 2023

(87) PCT Pub. No.: WO2022/201080
PCT Pub. Date: Sep. 29, 2022

(65) Prior Publication Data

US 2024/0175291 A1 May 30, 2024

Related U.S. Application Data

(60) Provisional application No. 63/165,489, filed on Mar. 24, 2021.

(51) Int. Cl.
*E05B 17/22* (2006.01)
*E05B 47/00* (2006.01)
*E05B 75/00* (2006.01)

(52) U.S. Cl.
CPC .......... *E05B 17/22* (2013.01); *E05B 47/0012* (2013.01); *E05B 75/00* (2013.01);
(Continued)

(58) Field of Classification Search
CPC ...... E05B 75/00; E05B 17/22; E05B 47/0012; E05B 2047/0067; E05B 2047/0094
(Continued)

(56) References Cited

U.S. PATENT DOCUMENTS 5,400,623 A * 3/1995 Bota ....................... E05B 75/00
128/869
9,771,742 B1 * 9/2017 Reed .................. B65H 75/4486
(Continued)

FOREIGN PATENT DOCUMENTS

CN 108412334 A 8/2018
CN 108505848 A * 9/2018
WO WO-2024107854 A1 * 5/2024 ........... A61B 5/0006

*Primary Examiner* — Kristina R Fulton
*Assistant Examiner* — James Edward Ignaczewski
(74) *Attorney, Agent, or Firm* — The Law Office of Joseph L. Felber

(57) ABSTRACT

Disclosed embodiments pertain to systems for monitoring and restraining an individual by using: a manacling apparatus comprising at least one restraining device, configured to be worn by the individual and to restrain movement of the individual; at least one sensor, configured to detect physical characteristics of an individual; and a processing and control module, configured to receive sensor data from the at least one sensor, analyze the received sensor data to determine whether restraining of the respective individual is required and control the restraining device(s) of the manacling apparatus, based on analysis results. Disclosed embodiments pertain to manacling apparatus for controllable restraining movements of an individual wearing the manacling apparatus, the manacling apparatus comprising: at least one
(Continued)

restraining device, each restraining device comprising one or more controllable components for controllable restraining of the individual.

20 Claims, 13 Drawing Sheets

(52) U.S. Cl.
CPC ................. *E05B 2047/0067* (2013.01); *E05B 2047/0094* (2013.01)

(58) Field of Classification Search
USPC ........................................................... 70/262
See application file for complete search history.

(56) References Cited

U.S. PATENT DOCUMENTS

| | | | | |
|---|---|---|---|---|
| 9,970,218 | B1 * | 5/2018 | Reed | F41H 13/0018 |
| 10,294,698 | B1 * | 5/2019 | Bartak | E05B 75/00 |
| 2005/0039499 | A1 * | 2/2005 | Didomenico | E05B 75/00 70/16 |
| 2006/0289017 | A1 * | 12/2006 | Schmeltz | A61F 5/3723 128/869 |
| 2009/0151401 | A1 * | 6/2009 | Phanstiel | A61F 5/3715 70/16 |
| 2010/0117413 | A1 * | 5/2010 | Squires | B60R 99/00 297/466 |
| 2013/0012795 | A1 | 1/2013 | Moenning et al. | |
| 2014/0355167 | A1 * | 12/2014 | Reese | A61B 5/28 361/232 |
| 2020/0131807 | A1 * | 4/2020 | Heiney | E05B 75/00 |
| 2022/0207635 | A1 * | 6/2022 | Hughes | E05B 45/00 |

* cited by examiner

Non-Restrained State

Restrained state

Restrained State

METHODS, SYSTEMS AND MANACLING APPARATUSES FOR RESTRAINING INDIVIDUALS

CROSS-REFERENCE TO RELATED APPLICATIONS

This PCT application claims priority from U.S. provisional application No. 61/165,489, filed Mar. 24, 2021, which is incorporated herein by reference in its entirety.

FIELD OF THE INVENTION

The present disclosure relates in general to systems, methods, mechanisms, apparatuses and devices for restraining movement of individuals and more particularly to systems, methods and devices for movement-restraining using manacling means.

BACKGROUND

Electronic tagging devices are commonly used for monitoring individuals mainly for sensing and indicating individuals' real time or near real time location.

An electronic tagging device usually includes an ankle bracelet that can be locked in a manner that will only enable authorized people to unlock the bracelet, one or more detection devices such as positioning device (such as a global positioning system (GPS) based device) and communication means for transmitting location data of the tagged individual to one or more monitoring devices and users.

Electronic tagging devices are often used for monitoring individuals that are in a house arrest or prisoners that have to be located in public places such as hospitals, for preventing them from escaping or harming the environment or others.

BRIEF DESCRIPTION OF THE FIGURES

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The figures are listed below.

FIG. 2A shows front isometric view of an individual wearing the inflatable manacling apparatus in a non-restrained state; FIG. 2B shows front isometric view of an individual wearing the inflatable manacling apparatus in a restrained state; and: FIG. 2C shows a zoomed-in view of an inflatable elbow restraint;

FIG. 3A shows a frontal isometric view of an individual wearing the joint-locking elbows and knees restraints in an unlocked (non-restraining) state; FIG. 3B shows a restraint; FIG. 3C shows a ratchet mechanism for locking and unlocking of the joint-locking restraint; FIG. 3D shows a frontal isometric view of the individual wearing the joint-locking elbows and knees restraints in an unlocked (non-restraining) state; and FIG. 3E shows a frontal isometric view of the individual wearing the joint-locking elbows and knees restraints in a locked (restrained) state;

FIG. 4A shows a frontal isometric view of an individual wearing elbows and knees restraints in an unlocked (non-restrained) state; and FIG. 4B shows a zoomed-in view of an elbow restraint;

FIG. 5A shows a frontal isometric view of an individual wearing the connected handcuff restraints of the manacling apparatus; FIG. 5B shows a first sided transparent view of a strap-length adjustor for controlling and adjusting length of connecting strap between the two handcuff restraints; FIG. 5C shows a perspective transparent view of a strap-length adjustor; and FIG. 5D shows a second sided transparent view of a strap-length adjustor;

FIG. 6A shows a back view of an individual wearing the manacling apparatus; FIG. 6B shows a zoomed-in view of a connecting loop connecting two cables of the manacling apparatus; FIG. 6C shows a back view of an individual wearing the manacling apparatus in a non-restrained state; FIG. 6D shows a side view of the individual wearing the manacling apparatus in a non-restrained state; FIG. 6E shows a back view of the individual wearing the manacling apparatus in a restrained state; FIG. 6F shows a side view of the individual wearing the manacling apparatus in a restrained state;

FIG. 7A shows a front view of an individual wearing the stimulator manacling apparatus over one ankle thereof; FIG. 7B shows the stimulator manacling apparatus in a locked position; and FIG. 7C shows the stimulator manacling apparatus in an open (unlocked) position; FIG. 8A shows a restraining device for an ankle's joint movement restriction; FIG. 8B shows a restraining device for a wrist's joint movement restriction; FIG. 8C shows a releasable locking mechanism of the wrist/ankle restraining device of FIGS. 8A and/or 8B; and FIG. 8D shows another type of a releasable locking mechanism, based on a ratchet mechanism.

DETAILED DESCRIPTION

Figure 1:
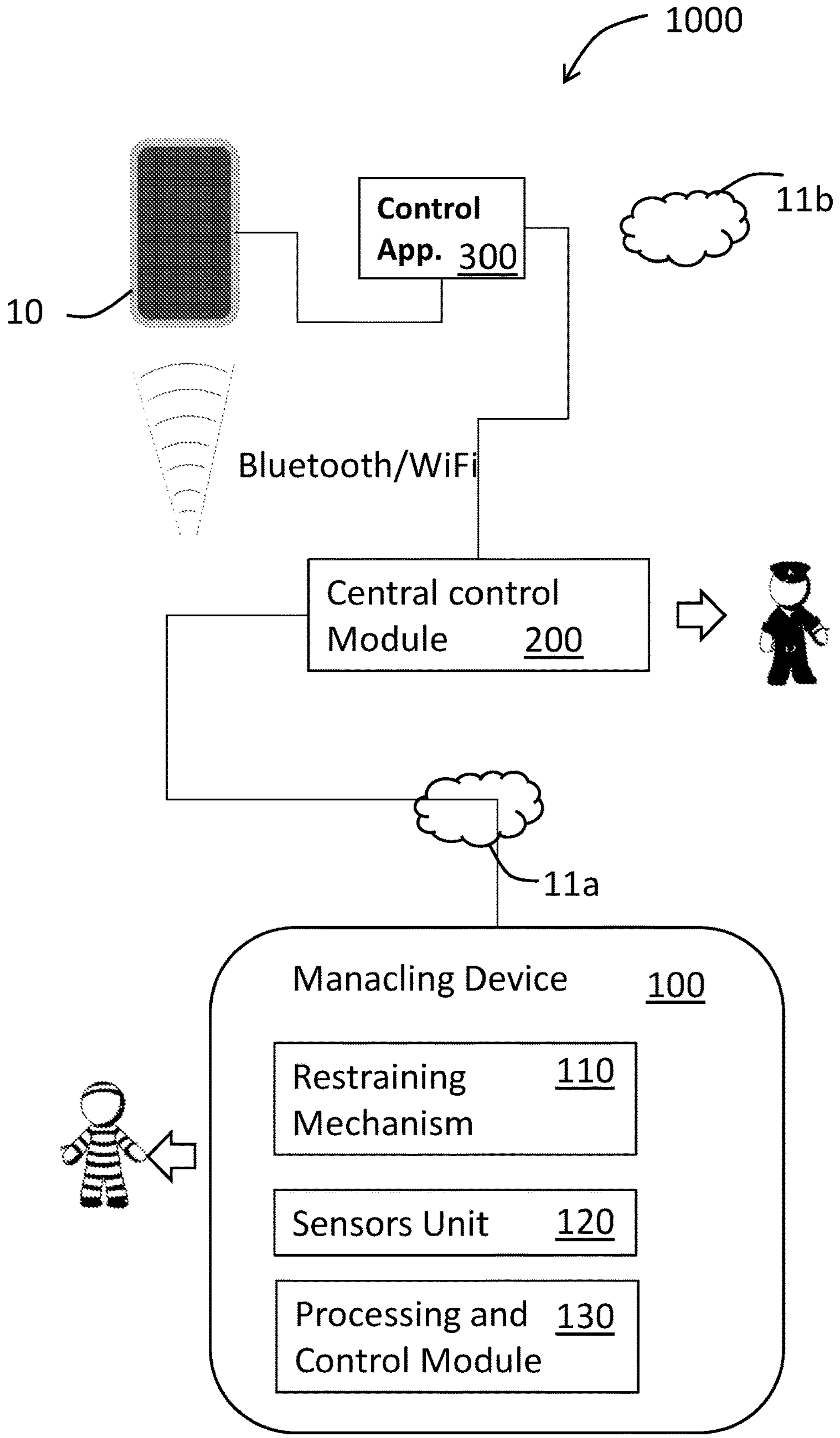
FIG. 1 is a block diagram, schematically illustrating a system for monitoring and restraining an individual, according to some embodiments.

Disclosed embodiments pertain to systems and methods for monitoring and restraining an individual by using a manacling apparatus comprising one or more restraining devices (herein also "restraints"), configured to be worn by the individual and to restrain movement of the individual; at least one sensor, configured to detect physical characteristics of an individual; and a processing and control module, configured to receive sensor data from the at least one sensor, analyze the received sensor data to determine whether restraining of the respective individual is required and control the restraining device(s) of the manacling apparatus, based on analysis results. Disclosed embodiments pertain to a manacling apparatus for controllable restraining movements of an individual wearing the manacling apparatus, the manacling apparatus comprising: at least one restraining device (restraint), each restraining device comprising one or more controllable components for controllable restraining of the individual.

Aspects of disclosed embodiments pertain to a system for monitoring and restraining an individual. The system may include:

(i) a manacling apparatus comprising:

at least one sensor, configured to detect at least one physical characteristics of an individual for enabling identification of one or more alarming states of the individual requiring restraining movement of the respective individual; and a restraining device, configured to by worn by the individual and to restrain movement of the individual; and (ii) a processing and control module, configured to receive sensor data from the at least one sensor of the respective manacling apparatus, analyze the received sensor data to determine whether a movement-restraining of the respective individual is required and control the restraining device, based on analysis results.

In some embodiments, upon determination of a requirement for movement restraining of the respective individual, the processing and control module controls the restraining device restraining device such as to physically restrain movement of the respective individual.

The system and manacling apparatus thereof may be used for monitoring and restraining dangerous or convicted people such as prisoners or people in house arrest, etc. prisoners that are required to appear in public places such as a hospital, a court, etc. This system, manacling apparatus and technique (methodic) of using thereof may also be helpful in reducing the number of people such as authorized enforcement/restraining staff members such as policemen, health authorized persons (e.g., for restraining a mentally and/or physically ill/disturbed individual), individual's caretaker, warders, etc.

According to some embodiments, the processing and control module may be embedded in the manacling apparatus and configured for automatic analysis of the sensor data and automatic responding to the analysis results, such as to have a self-monitoring and responding device capable of restraining the individual upon identification of such required action by activation of the restraining device of the manacling apparatus. The one or more sensors may also be embedded in the manacling apparatus.

According to other embodiments, the processing and control module may be remotely located from the manacling apparatus, wherein the processing and control module include a communication module for communication with the manacling apparatus and wherein the manacling apparatus further comprises an embedded communication module for communicating with the processing and control module.

According to some embodiments, the at least one sensor may include one or more of: a positioning device such as a GPS device, an accelerometer, a pressure sensor, a compass, an optical detector, a gyroscope device, pulse or heartbeat detector, blood pressure detector, microphone, camera; for detecting at least one of the following physical characteristics of the individual: positioning/location, pulse, falling, running, walking, environment of the individual etc.

According to some embodiments, the processing and control module may operate receive the sensor data from all the sensors and operate an analysis module (e.g., algorithm) to determine, based results of sensor data analysis (herein also "analysis results") whether or not the restraining of the individual should be activated and if system enables determine the level of restraint. Once a restraining requirement is determined (and optionally also restraint level), the processing and control module may control the restraining device (e.g. via sending command signals or data).

In some embodiments, a "restraining required state" of the individual may be determined using one or more preset and/or adjustable criteria, which may be based on one or more thresholds used for each sensor/sensing type.

For example, if the location of the individual trespasses a predefined bordering perimeter, the bordering perimeter defining therein "an allowed area" in which the individual can be located, the restraining device of the manacling apparatus may be immediately operated. However, if the individual is within the allowed area It is noted that the terms "manacle", "manacling" etc. may refer to any act of restraint such as the act(s) of fettering, cuffing, shackling, wrapping, grasping, gripping, fastening, chaining, securing, locking, tying, binding, attaching, and the like.

It is noted that the term "individual" may refer to a human or an animal subject.

According to embodiments, the restraining device of the manacling apparatus may include fettering means such as handcuffs for various parts of the individual's limbs such as wrists, elbows, knees and/or ankles—enabling restraining movement of the individuals by forcing his/her limb joints into a specific position and/or a specific distances therebetween.

According to some embodiments, the manacling apparatus(s) of the system may be controlled manually via a designated user control panel or user interface based on monitoring (sensor) data by enabling real time or near real time online display of the monitored data and enabling one or more authorized users to control the manacling apparatus(s) remotely for restraining of the individual(s) thereby.

According to some embodiments, one or more of the manacling apparatuses of the system may be designed to limit/prevent movement of one or more body parts of the individual such as any one or more of: limb(s), hip(s), pelvic, torso, thigh(s), abdomen, back, neck, limb(s)'s joint(s) etc.

FIG. 1 is a block diagram, schematically illustrating a system 1000 for monitoring and restraining an individual, according to some embodiments. The system 1000 may include one or more manacling apparatuses such as manacling apparatus 100, configured to restrain an individual as well as to monitor in real time physical characteristic(s) thereof.

The manacling apparatus 100 may include:

a restraining device 110, configured to physically restrict movement of the individual wearing the manacling apparatus 100, the restraining device 110 being electronically/ optically controllable such that upon receiving electric/optical signal, it conducts one or more physical (mechanical) operations for physically (e.g., mechanically) restraining or un-restraining the individual;

a sensors unit 120 including one or more sensors embedded in the manacling apparatus 100 for sensing one or more physical characteristics of the individual such as positioning/location, pulse, voice, imagery, pressure applied by the individual (e.g. over the manacling apparatus itself, etc.); and a processing and control module 130 configured to receive sensor data from the one or more sensors, analyze (process) the received sensor data and determined, based on analysis of the sensor data and analysis results, whether there is a need to restrain the individual or not and optionally the level of restraint required, depending on the exact identified situation.

The system 1000 may also include a central control module 200 (acting instead or in addition to the processing and control module 130, configured to receive information from each of the manacling apparatus 100 of the system 1000 in real time or near real time, such as sensor data for analyzing thereof at the central control module 200 and/or analysis results etc., and may also be configured for remotely controlling each manacling apparatus 100 for remotely controlling individuals' restraint.

For example, the central control module 200 may be operable via one or more main servers for supervised remote monitoring and restraining of individuals. The manacling apparatus 100 may be configured to communicate with the one or more servers via one or more communication networks and/or protocols such as via network 11*a*.

In some embodiments, as shown in FIG. 1, the main server and central control module 200 may also be adapted to support a designated mobile control application 300 installable and operable via a mobile device 10, enabling an authorized person such as a policemen to view monitoring related information relating to one or more individuals that are under surveillance, control restraining thereof and store accumulated acquired sensor data and analysis thereof.

The manacling apparatus 100 may also be configured to communicate with close by mobile devices or stationary devices via local short-range communication networks, channels and/or protocols such as via Bluetooth and/or Wi-Fi communication networking.

The application 300 may also be configured to communicate with remotely located devices such as with the main server for updating the central control module 200 via one or more networks, such as the cellular communication network 11*b*.

Figure 2A:
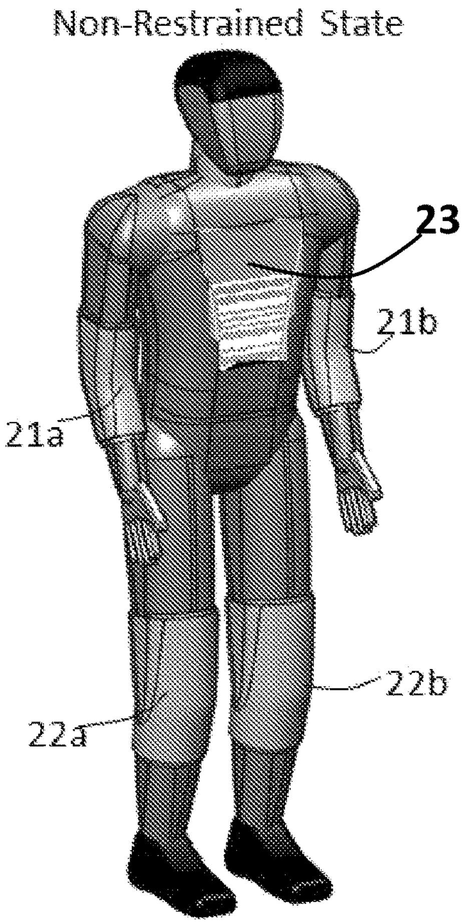
FIGS. 2A-2C show a manacling apparatus using inflatable limb-joint restraints, according to some embodiments.
Figure 2B:
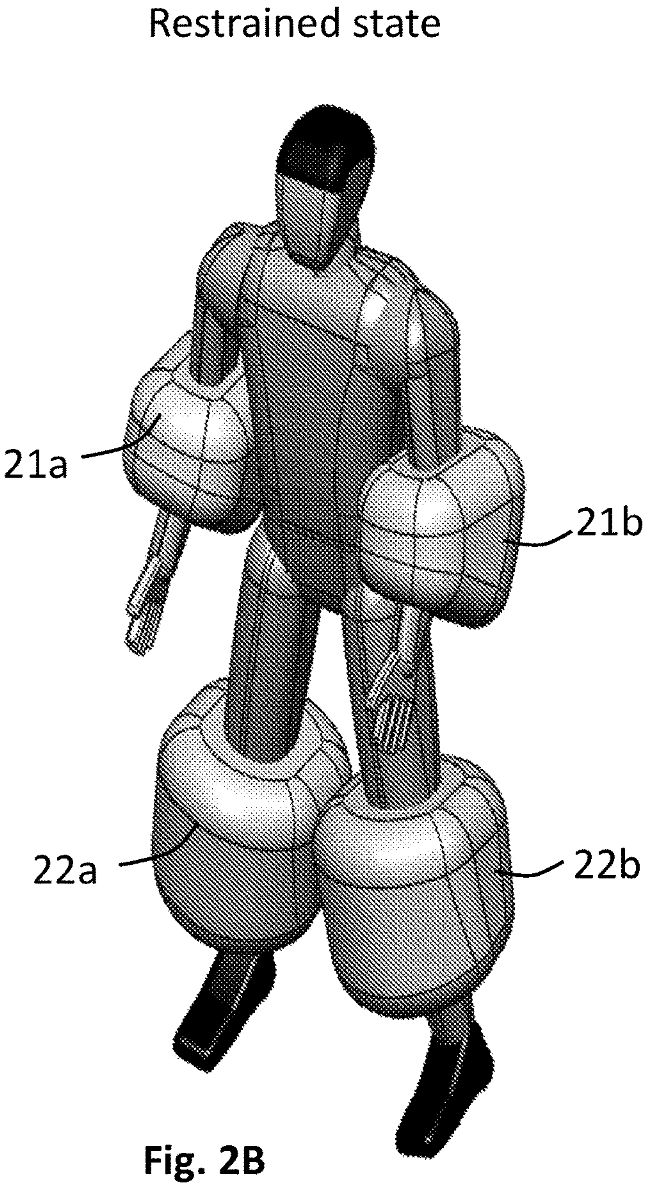
Figure 2C:
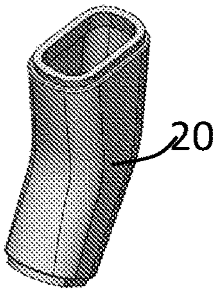

FIGS. 2A-2C show a manacling apparatus using inflatable limb-joint restraints including: two inflatable elbow-restraints 21*a*-21*b*, two inflatable knee-restraints 22*a*-22*b*, and one or more torso inflatable restraints such as chest restraint 23, according to some embodiments: FIG. 2A shows front isometric view of an individual wearing the inflatable manacling apparatus in a non-restrained state; and FIG. 2B shows front isometric view of an individual wearing the inflatable manacling apparatus in a restrained state. Each restraint 21*a*, 21*b* 22*a*, 22*b* and/or 23 may include one or more inflatable air-bags that can be electronically controllable for inflating thereof, where the inflation of the bags restricts the movements of the limbs joints and optionally the torso and/or neck movements, thereby restricting and restraining the overall movement and progressing ability of the individual.

FIGS. 3A-3E show a manacling apparatus using limb-joint restraints 31*a*-31*b* and 32*a*-32*b* that enable locking elbows and/or knees joints into a locked position, according to some embodiments. The restraints 31*a*-31*b* and 32*a*-32*b* may be similar in design and manner of operation but differ in size of the particular joint (elbow/knee) they are to be attached to.

Figure 3A:
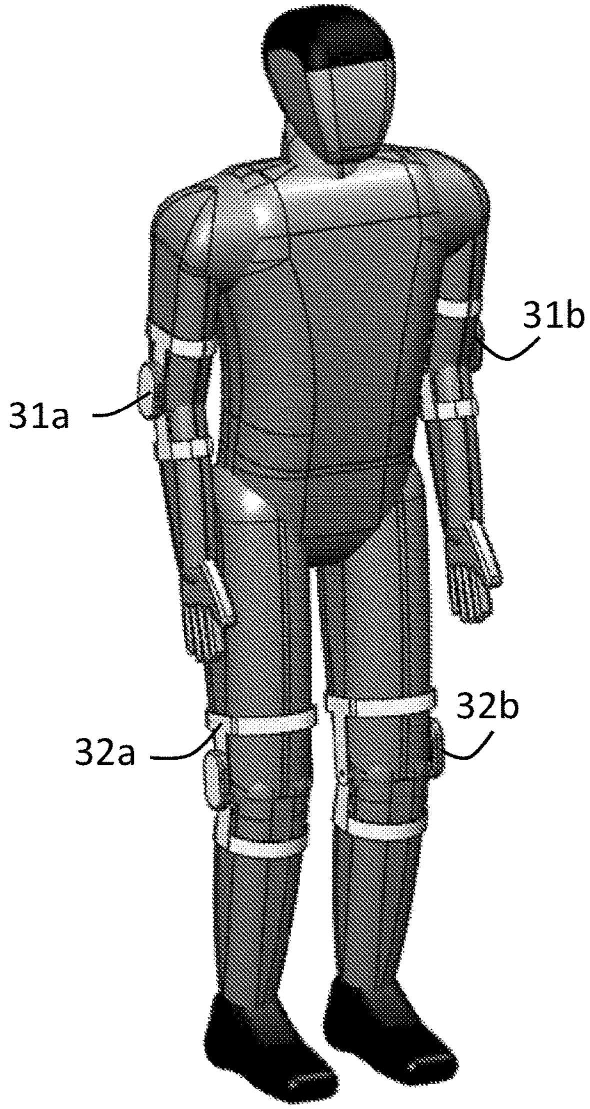
FIGS. 3A-3E show a manacling apparatus using limb-joint restraints that enable locking elbows and/or knees joints into a locked position, according to some embodiments.
Figure 3B:
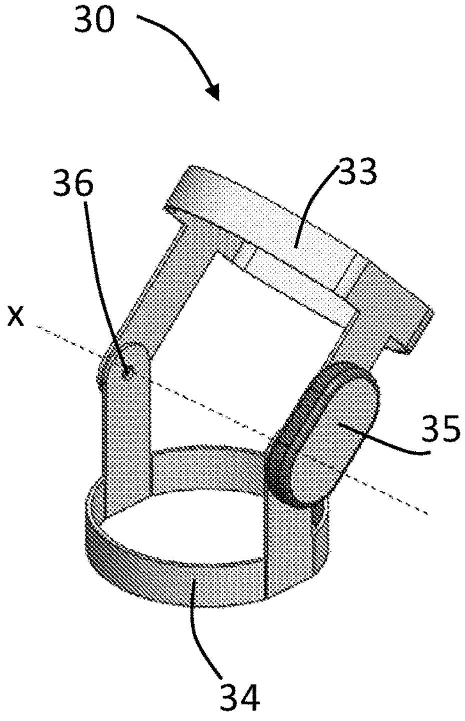
Figure 3C:
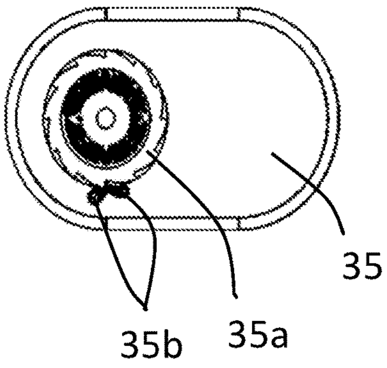

FIGS. 3A-3C show how the joint restriction/locking operates: each restraint such as restraint 30, includes an upper bracketing member 33, a lower bracketing member 34 hinged to the upper bracketing member 33 such as to enable movement of the bracket members 33 and 34 in respect to one another, about an axis x, and a locking mechanism 35.

The upper bracket member 33 has a bracketing ring that is configured to bracket one part of the limb (e.g., upper arm) of the individual and the lower bracketing member 34 is configured to bracket another part of the limb (e.g., forearm) of the individual.

The locking mechanism 35 may include a ratchet mechanism 35*a* having a lock-safety-catch, optionally a clutching/coupling device (for enabling detachment of the locking mechanism in an unlocked position and coupling thereof to lock the limb, and a spring for enabling rotation of one or the bracketing members towards the other to force the limb to fold about its limb joint and locking the limb in the folded position.

Figure 3D:
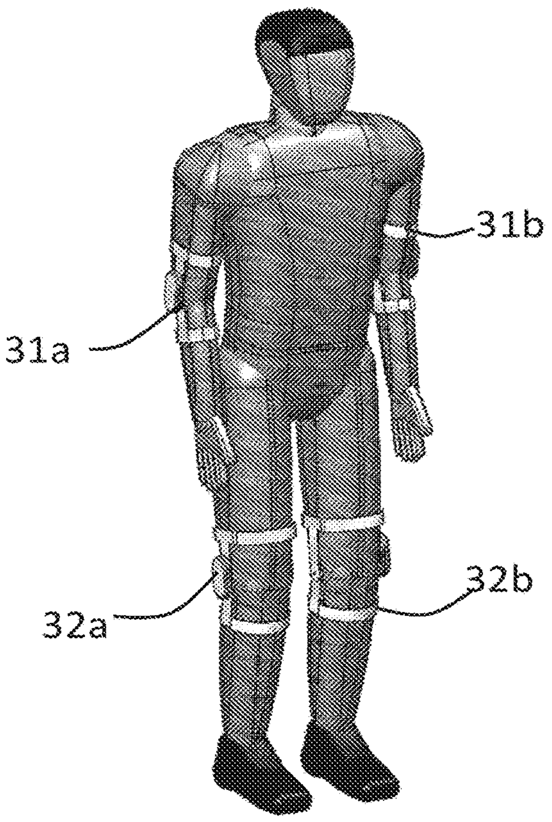
Figure 3E:
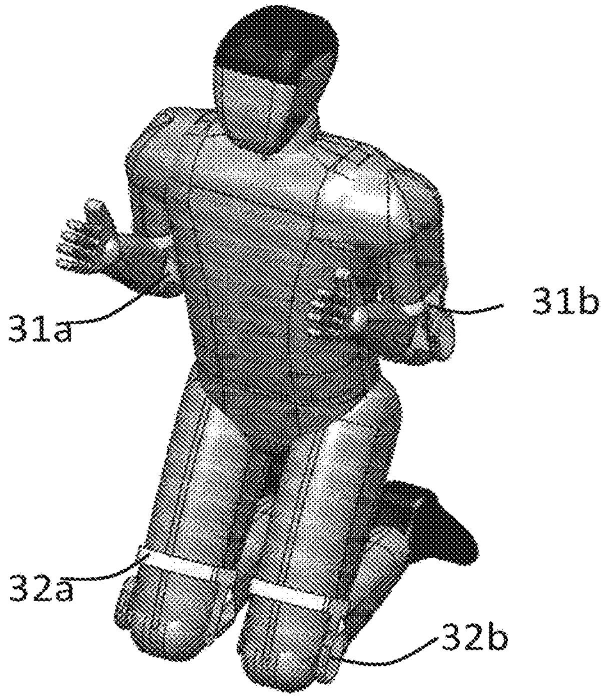

FIG. 3D shows a frontal isometric view of the individual wearing the joint-locking elbows and knees restraints in an unlocked (non-restraining) state; and FIG. 3E shows a frontal isometric view of the individual wearing the joint-locking elbows and knees restraints in a locked (restrained) state. It is shown that the restrained state the individual is forced to a kneeling position in which his/her limbs are folded about their joints thereby preventing the individual from making walking or advancing movements.

Figure 4A:
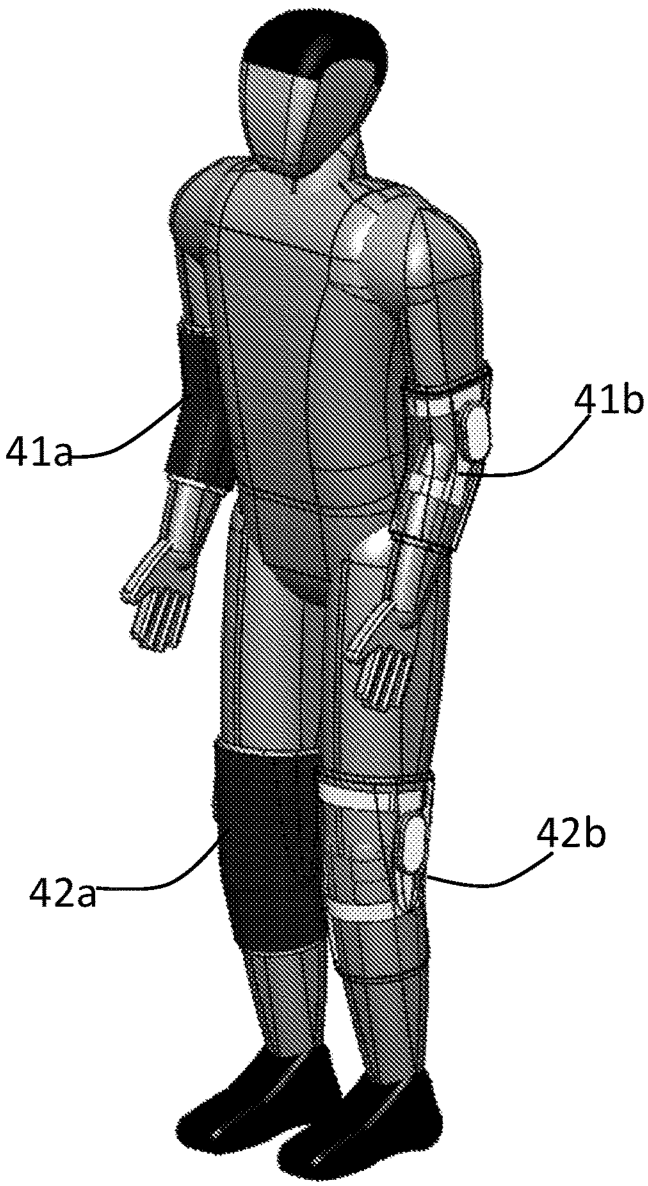
FIGS. 4A-4B show a manacling apparatus using limb-joint restraints that enable locking elbows and/or knees joints into a locked position, combined with air bags for also enabling inflating the restraints for further restraining the individual if required, according to some embodiments.
Figure 4B:
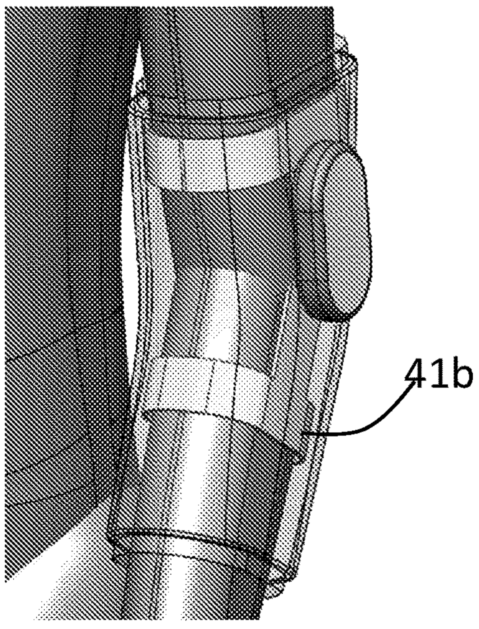
Figure 5A:
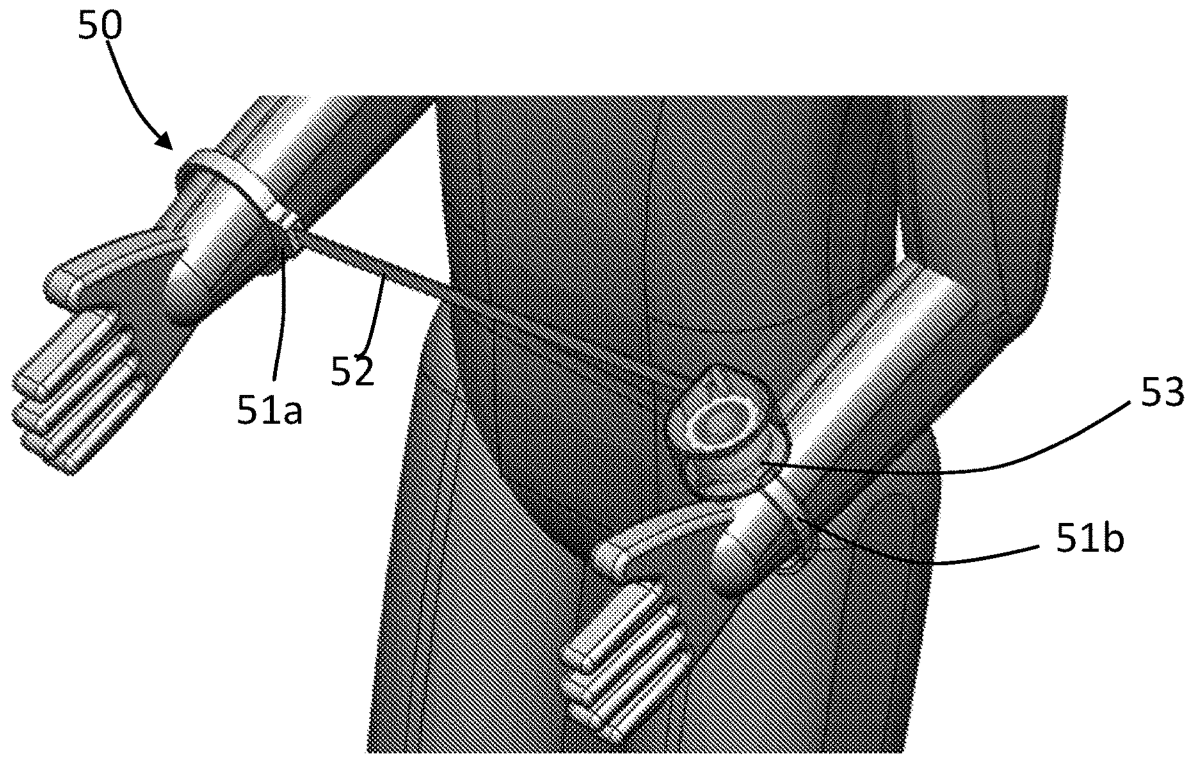
FIGS. 5A-5D show a manacling apparatus using connectable handcuffs, for determining level of movement restraint of the individual's hands, by controlling length of a connecting strap connecting the two handcuffs, according to some embodiments.
Figure 5B:
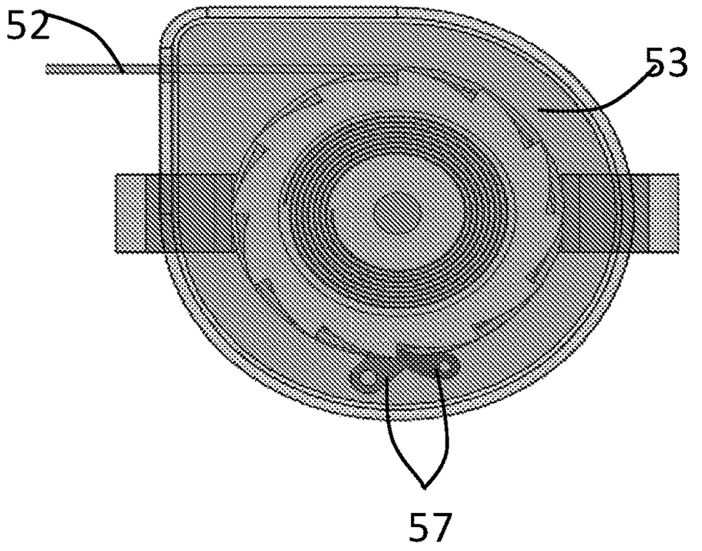
Figure 5C:
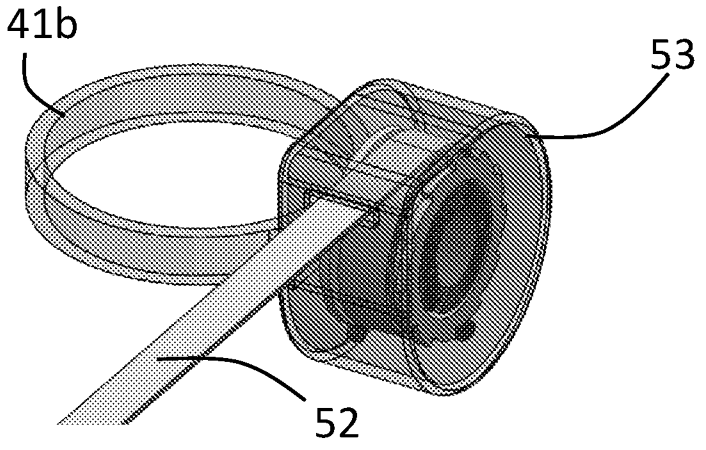
Figure 5D:
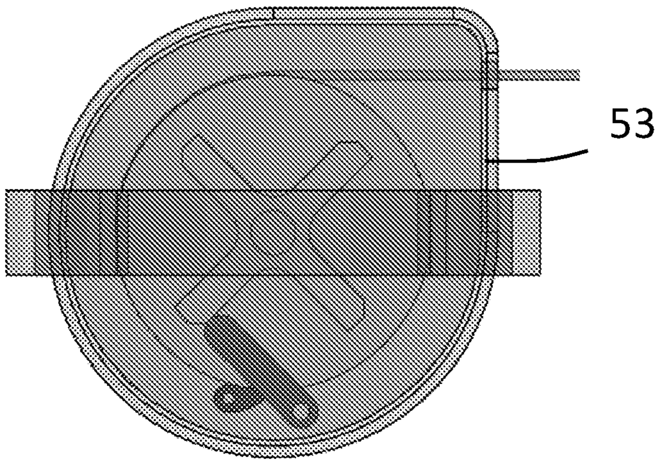
Figure 6A:
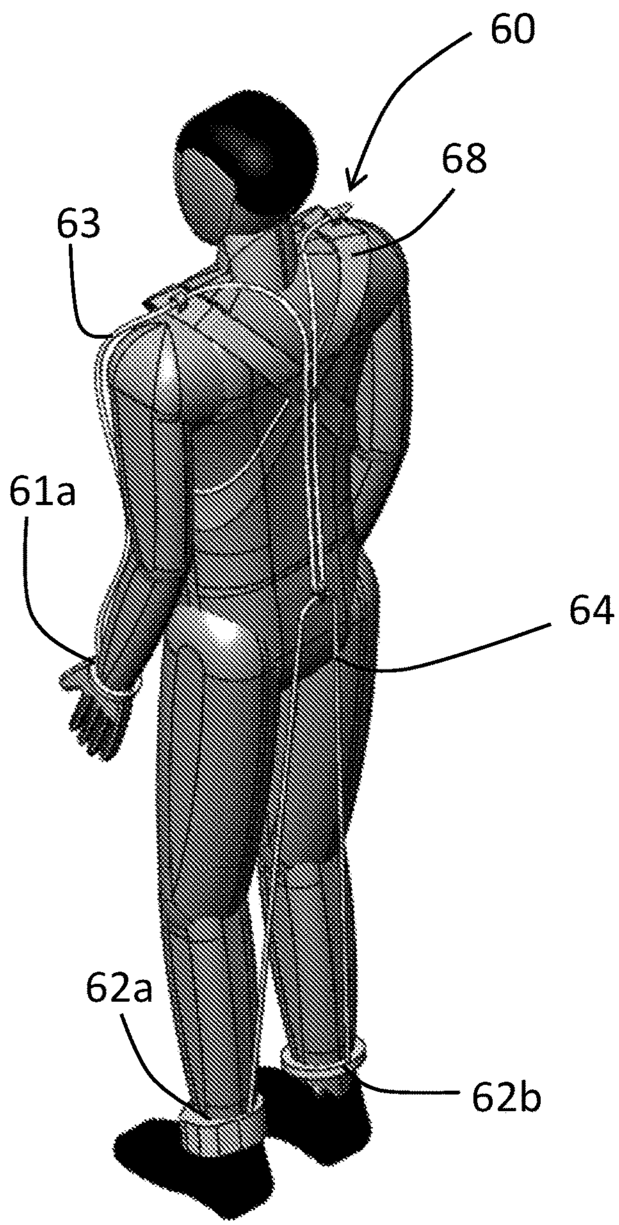
FIGS. 6A-6F show a manacling apparatus using cables-based restraining device, for controlling restraint and determining level of restraint of the individual, by controlling relative lengths between connecting cables.
Figure 6B:
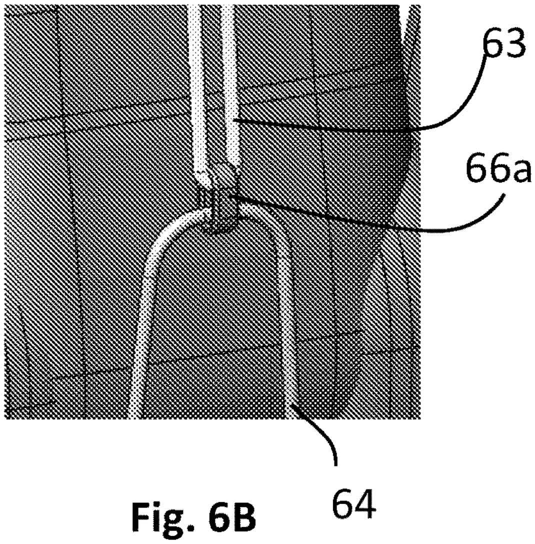
Figures 6C, 6D:
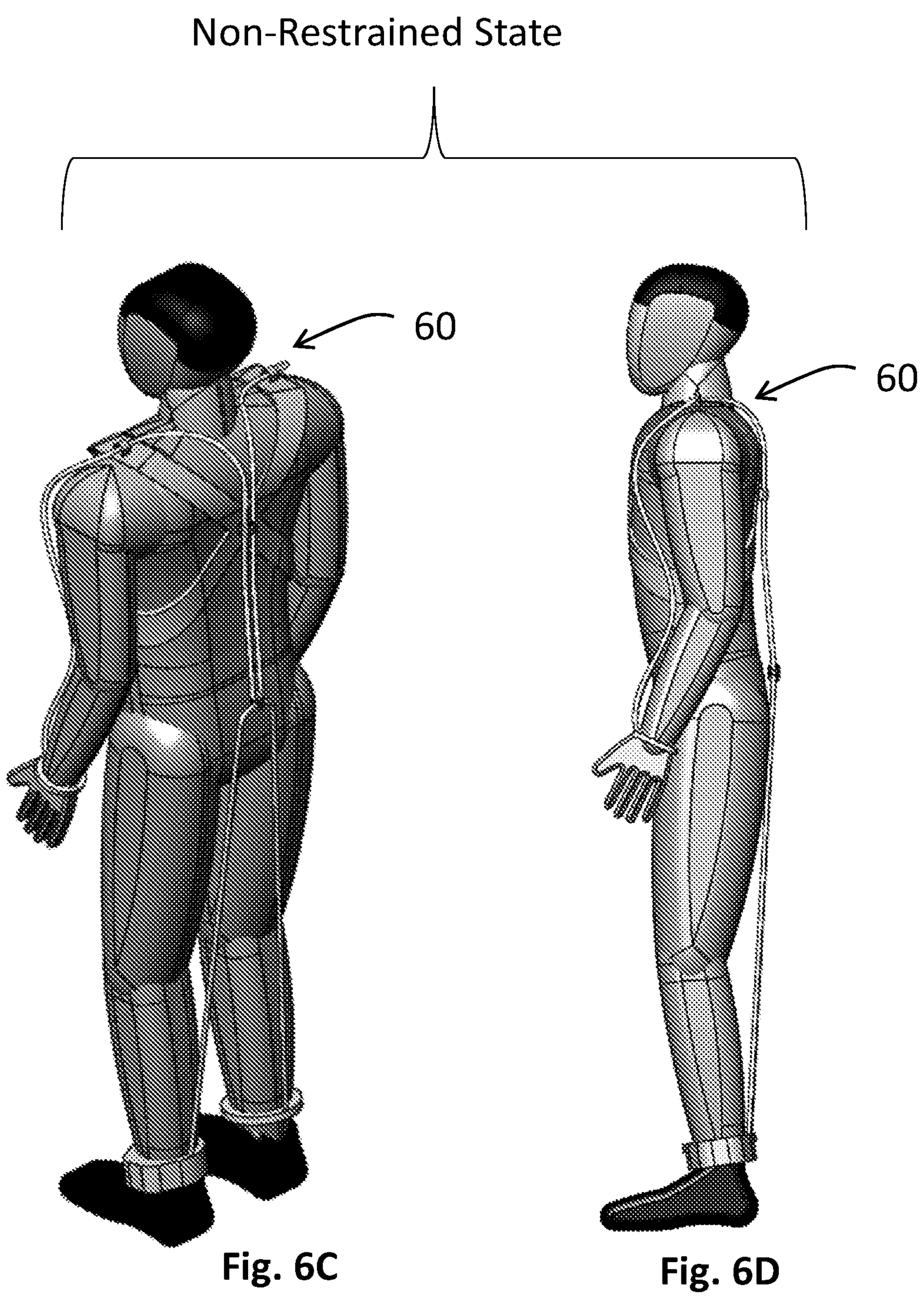
Figure 6E:
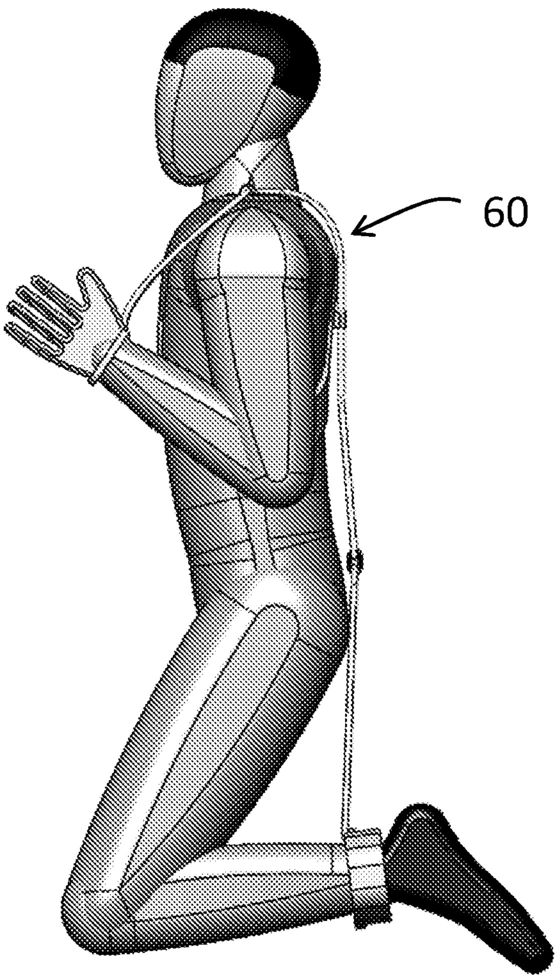
Figure 6F:
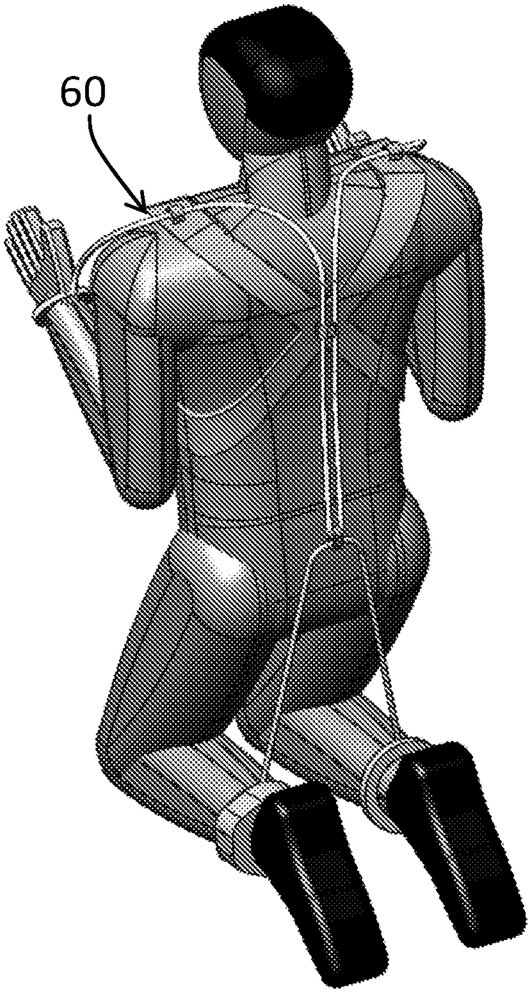

FIGS. 4A-4B show a manacling apparatus using limb-joint restraints 41*a*-41*b* and 42*a*-42*b* that enable locking elbows and/or knees joints into a locked position, combined with air bags for also enabling inflating the restraints for further restraining the individual if required, according to some embodiments: FIG. 4A shows a frontal isometric view of an individual wearing elbows and knees restraints in an unlocked (non-restrained) state; and FIG. 4B shows a zoomed-in view of an elbow restraint;

FIGS. 5A-5D show a manacling apparatus 50 using connectable handcuffs 51*a* and 51*b*, for determining level of movement restraint of the individual's hands, by controlling length of a connecting mechanism such as a connecting strap 52 connecting the two handcuffs 51*a* and 51*b*, using a strap length adjustor 53, according to some embodiments. The length adjustor may be similar to the ratchet-based adjustor 35.

FIGS. 6A-6F show a manacling apparatus 60 using cables-based restraining device, for controlling restraint and determining level of restraint of the individual, by controlling relative lengths between connecting cables, according to embodiments. The cables may include any flexible elongated element such as a strap, a string, a chain, and the like.

The manacling apparatus 60 may include:

two wrist restraints 61*a* and 61*b* (e.g. handcuffs);

an upper connecting cable 63 connecting the wrist restraints 61*a* and 61*b*;

two ankle restraints 62*a* and 62*b*;

at least one connecting mechanism such as a lower connecting cable 64 connecting the ankle restraints 62*a* and 62*b*;

a harness 68 wearable over the individual's torso; and multiple channeling loops such as main channeling loop 66*a* connecting through which both the upper connecting cable 63 and lower connecting cable 64 are threaded.

According to some embodiments, to restrain the individual, the upper and lower connecting cables 63 and 64 are shortened (e.g. via a ratchet mechanism, roller, electrical roller, pulley, etc. located in at least one of the wrist and ankle restraints 61*a*-61*b* and 62*a*-62*b*). Once the length of at least of the upper and/or lower connecting cables 63 and/or 64 is shortened, the individual is forced into a folded position (see FIGS. 6C-6F).

Figure 7A:
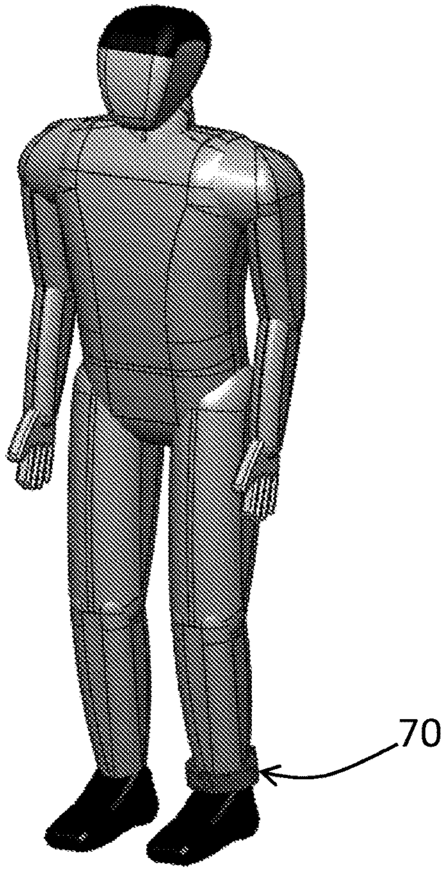
FIGS. 7A-7C show a stimulator manacling apparatus, wearable over an individual's limb(s) (wrist and/or ankle), having a fetter like restraint which has an embedded stimuli applying mechanism therein, for applying sensory stimuli to the individual wearing the restraint when required.
Figure 7B:
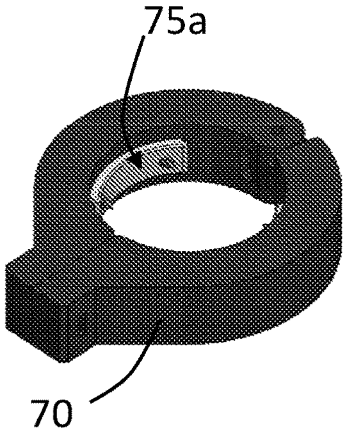
Figure 7C:
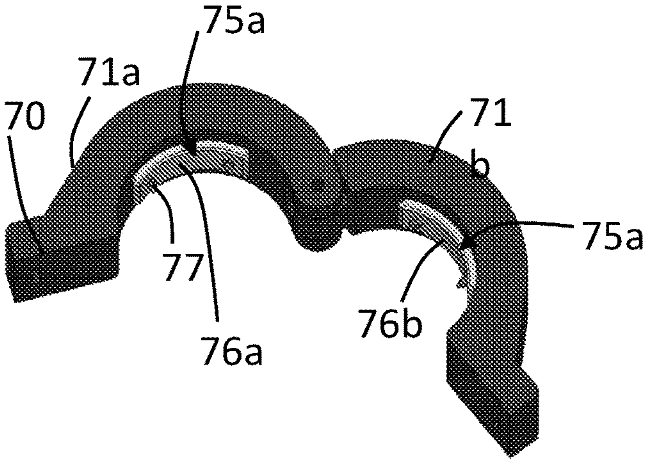

FIGS. 7A-7C show a manacling apparatus including a stimulator bracketing device 70, wearable over an individual's wrist or ankle, having a cuff/fetter like restraint which has an embedded stimuli-applying mechanisms 75*a* and 75*b* therein, for applying sensory stimuli to the individual wearing the device 70.

According to embodiments, the stimulator bracketing device 70 includes two lockable and openable bracket elements 71*a* and 71*b* forming a ring shape when locked on to an individual's wrist/ankle, and two stimuli-applying mechanisms 75*a* and 75*b*.

According to some embodiments, as shown in FIGS. 7B-7C, each of the stimuli-applying mechanisms 75*a* and 75*b* is located over an inner side of the respective bracket element 71*a*/71*b* and includes a retractable elastic element 76*a*/76*b* (which may be electronically controllable) and one or more pointy or sharp elements such as pins 77 capable and located such as to be able to be ejected outwardly from the elastic element and towards the skin of the individual.

In other embodiments other additional or alternative stimulation types and devices may be used such as heating elements, electric current applying elements etc.

According to some embodiments, the manacling apparatus may enable automatically, remotely and/or manually controllable restriction of pivotal movement of one or more joints of an individual such as limb(s) (wrist(s) and/or ankle(s)) joints movement restriction/disablement/locking.

Figure 8A:
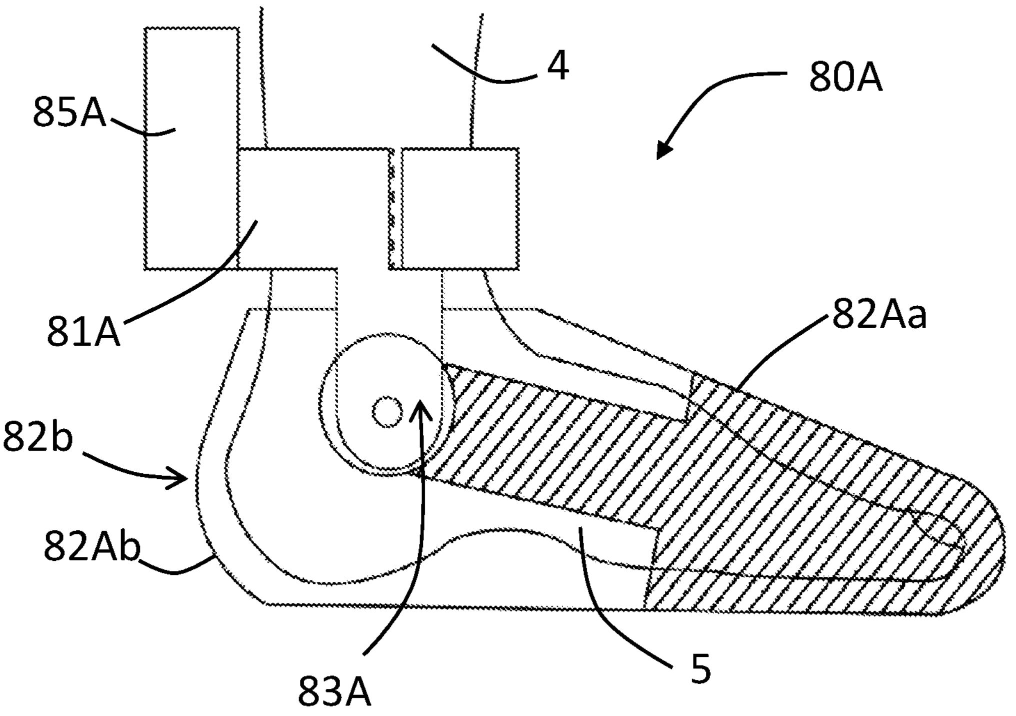
FIGS. 8A-8D show restraining devices for restricting pivotal limbs' joint movement of an individual, according to some embodiments.
Figure 8B:
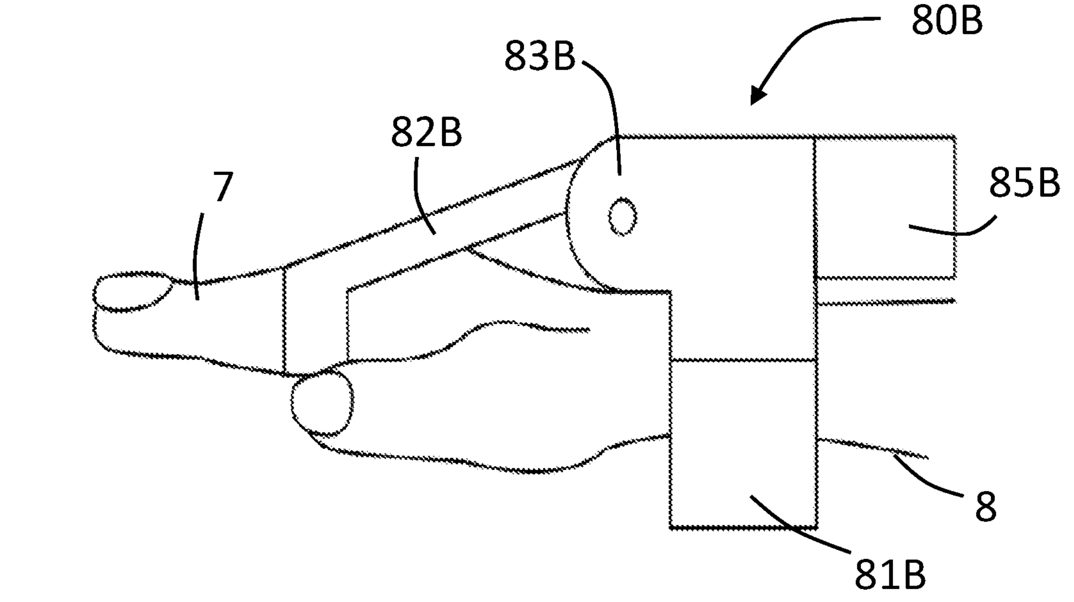

FIGS. 8A-8B show a manacling apparatus 80A/80B for restricting pivotal joint movement of a limb joint (e.g., ankle/wrist) of an individual, according to some embodiments.

FIG. 8A shows an ankle joint restraining device 80A, according to some embodiments, configured for an ankle's joint movement restriction, by preventing/restricting a shin 4 of the individual from pivotally moving in respect to the individual's foot 5. The restraining device 80A may include, for example:

a bracing ring 81A configured to wrap around a lower part of the individual's shin;

- a footwear 82A comprising at least one frontal rigid portion 82Aa configured to cover the individual's front foot part, and a rear portion 82Ab connected to the frontal rigid portion 82Aa; and
- a motorized locking mechanism 83A powered via a power source such as a battery unit 85A, the motorized locking mechanism 83A being configured to releasably lock the restraining device 80A into a restricting position, in which the footwear 82A is locked to the bracing ring 81A such as to prevent/restrict ankle joint pivotal movements of the individual.

FIG. 8B shows a wrist joint restraining device 80B, according to some embodiments, configured for a wrist's joint movement restriction, by preventing/restricting a hand palm 7 of the individual from pivotally moving in respect to the individual's forearm 8. The restraining device 80B may include, for example:

a bracing ring 81B, which is a rigid rink-like element, configured to wrap around a lower part of the individual's shin;

a hand-wear 82B having at least one rigid apparatus that constraints relative movements of at least some of the individual' fingers; and a motorized locking mechanism 83B powered via a power source such as a battery unit 85B, the motorized locking mechanism 83B being configured to releasably lock the restraining device 80B into a restricting position, in which the hand-wear 82B is locked to the bracing ring 81B such as to prevent/restrict wrist joint pivotal movements of the individual.

Figure 8C:
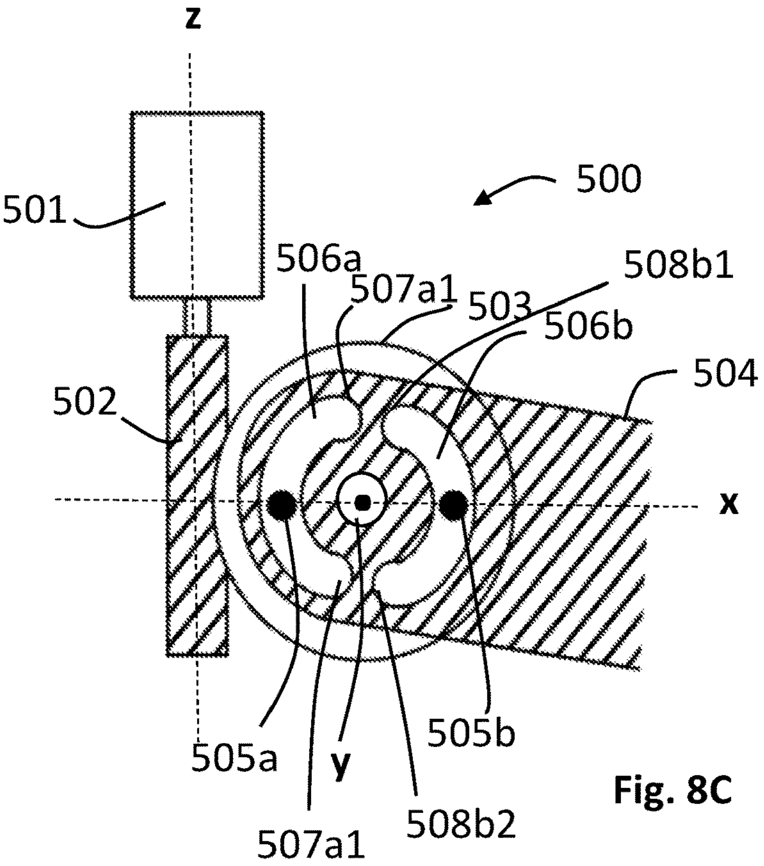

FIG. 8C shows a releasable locking mechanism 500 of the wrist/ankle manacling apparatus 80A and/or 80B of FIG. 8A and/or FIG. 8B, according to some embodiments (describing a possible configuration of locking mechanism 83A/B for locking the bracing ring 91A/B to the foot/hand wear 92A/B). The locking mechanism 500 may include, for example:

a motor 501;

a rotatable element 502 such as a rotatable screw, configured and arranged to be rotated about an axis z by the motor 501;

a cogwheel 503 enagageable with the rotatable element 502 such that once the rotatable element 502 is rotated about the z axis, the cogwheel is rotated thereby about a perpendicular y axis;

one or more pins such as pins 505*a* and 505*b,* which may be fixedly connected to the cogwheel 503 such that the pins 505*a* and 505*b* are rotatable therewith about the same axis y, once the cogwheel 503 is rotated by the rotatable element 502; and a rigid element 504 which may be fixedly connected to the bracing ring 91A/91B, the rigid element 504 may have indented or grooved tracks such as tracks 506*a* and 506*b* in/along which the pins 505*a* and 505*b* are movable. The configuration of each of the tracks 506*a* and 506*b* is such that a respective pin 505*a*/505*b* inserted therein is limited in its span of movement therein such that the first pin 506*a* is blocked by edges 507*a*1 and 507*a*2 of the first track 506*a,* and the second pin 506*b* is blocked by edges 508*b*1 and 508*b*2 of the second track 506*b*.

According to some embodiments, the rotation of rotatable element 502 by the motor 501 to one rotation direction (e.g., clockwise) about a first rotation axis parallel to axis z, will cause rotation of the cogwheel 503, engaging therewith, at a first cogwheel rotation direction about a second rotation axis parallel to the y axis. The rotation of the cogwheel 503 about the y axis will cause the pins 505*a* and 505*b* fixedly connected to the cogwheel 503 to rotate therewith at the same first cogwheel rotation direction about the y axis. The rotation of the pins 505*a* and 505*b* will be blocked at opposite edges of the tracks such as edges 507*a*1 and 508*b*2, while the motor will be prevented from further rotation of the rotatable element 502 to any direction, thereby locking the bracing ring 81A/81B to the foot/hand wear 82A/82B at a specific position, preventing the foot or the hand palm of the individual from rotating in respect to the individual's shin or forearm.

Figure 8D:
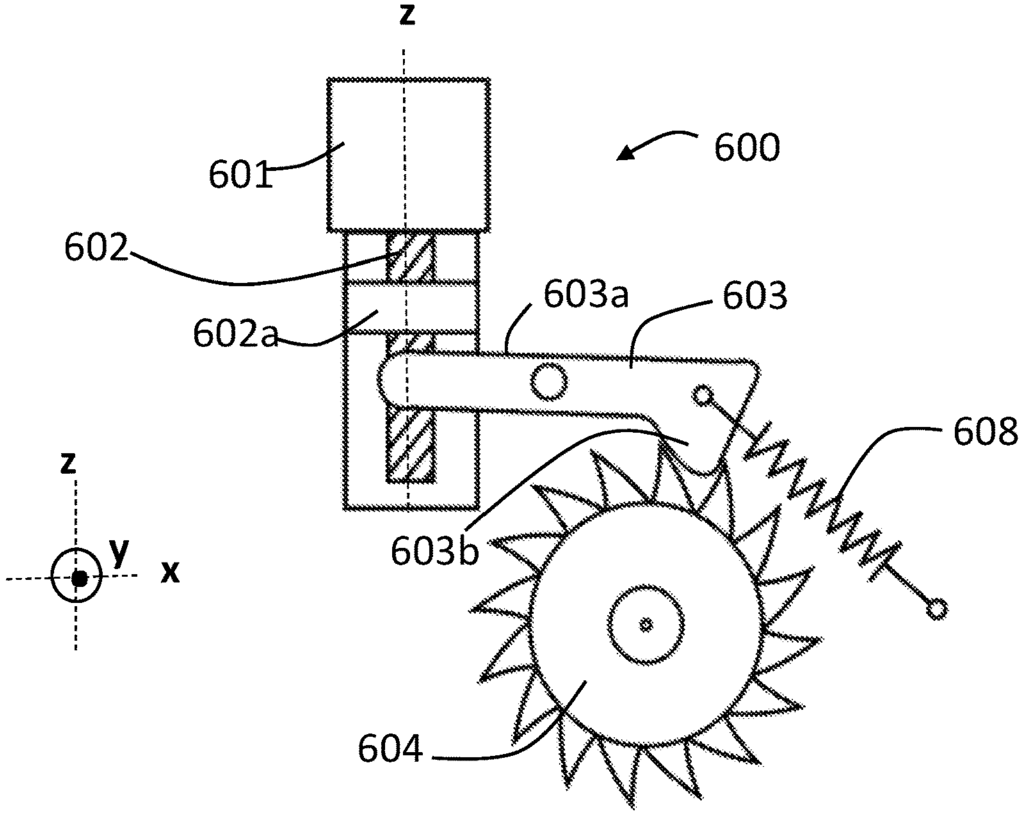

FIG. 8D shows another releasable locking mechanism 600 of the wrist/ankle manacling apparatus 80A and/or 80B of FIG. 8A and/or FIG. 8B, according to some embodiments (describing a possible configuration of locking mechanism 83A/B for locking the bracing ring 81A/B to the foot/hand wear 82A/B). The locking mechanism 600 may include, for example:

a motor 601;

a linear actuator including: a rotatable element 602 such as a rotatable screw, configured and arranged to be rotated about an axis z by the motor 601; and a bolt nut 602*a* threaded over the rotatable element 602 such that it can be linearly displaced along the z axis by rotation of the rotatable element 602;

a moveable element 603 having a connector arm 603*a* and a protrusion 603*b* integrally/fixedly connected to one another, the moveable element 603 being pivotally movable about an axis y that is perpendicular to the rotation axis z of the rotatable element 602 by being rotated in response to linear displacement of the nut 602*a* of the linear actuator; and a ratchet wheel 604 having inclined teeth, the ratchet wheel 604 being enagageable with the protrusion 604*b* of the moveable element 603 such that once the moveable element 603 is rotated about the y axis, the ratchet wheel 604 is rotated thereby about an axis that may be also parallel to the y axis. The ratchet wheel 604 being connectable to the bracing ring 81A/81B.

The ratchet wheel 604 can only be rotated to one rotation direction thereby enable locking of the bracing ring 81A/81B to the foot/hand wear 82A/82B at a specific position, preventing the foot or the hand palm of the individual from rotating in respect to the individual's shin or forearm.

According to some embodiments, the locking mechanism 600 may further include a tension mechanism, for maintaining the protrusion 603*b* of the moveable element 603 in engagement with the ratchet wheel 604. The tension mechanism may include, for example, a spring element 608, fixed at one edge thereof to the moveable element 603 and optionally to the bracing ring or foot/hand wear 82A/82B of the restraining device 80A/80B, at another edge thereof.

According to some embodiments, any one of the limb joints manacling apparatuses may enable locking foot/hand joint's posture when the locking mechanism is operated (e.g., rotated) in one direction and in an opposite direction such that any movement (e.g. rotation) of the rotatable elements such as elements 502 and 603 to one rotation direction and to an opposite rotation direction will lock the manacling apparatus and prevent/limit the particular limb joint's movement.

According to some embodiments, the manacling apparatus may include at least two such ankle and/or wrist joints restraining devices may also include: (i) one or more controllers such as MEMS controller for controlling each motor of each restraining device being used, and one or more sensors for sensing one or more characteristics of the individual being constrained by the manacling device, such as a positioning/location device, a sensor for identifying the posture in which the individual is locked, physical/medical sensing devices such as for sensing pulse, sweat, movement of the individual. Accelerometer, microphone, camera, visual sensors etc.

The motors of some of the restraining devices or manacling apparatuses shown above may be remotely, automatically and/or manually controllable, e.g., based on analysis of sensor data in real time or near real time.

According to some embodiments, the monitoring system 1000 of FIG. 1, may be configured to monitor multiple individuals, where each individual is restricted by a manacling apparatus comprising one or more of the restraining devices shown in FIGS. 8A-8B, where each locking mechanism 83A/83B/500/600 of each restraining device 80A/80B may be separately and/or simultaneously controllable (e.g., by separate/simultaneous motors' 501/601 control) via the central control module 200 of the system 1000.

EXAMPLES

Example 1 is a system for monitoring and restraining at least one individual, the system comprising:

at least one manacling apparatus, each manacling apparatus comprising at least one restraining device, configured to be worn by the individual and to restrain movement of an individual:

at least one sensor, configured to detect at least one physical characteristics of an individual; and a processing and control module, configured to receive sensor data from the at least one sensor of each manacling apparatus, analyze the received sensor data to determine whether restraining of the respective individual is required and control each of the at least one restraining device of the manacling apparatus of the respective individual, for physical restraining of the respective individual, based on analysis results.

In example 2, the subject matter of example 1 may include, wherein the processing and control module is embedded in the manacling apparatus and configured for automatic analysis of the sensor data and automatic responding to the analysis results.

In example 3, the subject matter of any one or more of examples 1 to 2 may include, wherein the processing and control module is remotely located from the manacling apparatus, wherein the processing and control module comprises a communication module for communication with the manacling apparatus and wherein the manacling apparatus further comprises an embedded communication module for communicating with the processing and control module.

In example 4, the subject matter of any one or more of examples 1 to 3 may include, wherein the at least one sensor comprises one or more of: a positioning device, an accelerometer, a pressure sensor, a compass, an optical detector, a gyroscope device, pulse or heartbeat detector, blood pressure detector, microphone, camera.

In example 5, the subject matter of any one or more of examples 1 to 4 may include, wherein the restraining device of the manacling apparatus comprises at least two restraints configured for restraining limb joints of the individual to which each of the restraints is attached.

In example 6, the subject matter of any one or more of claims 1 to 5 may include, wherein each of the restraints comprises an inflatable airbag configured such that the limb-joint restraining is done by inflation of each of the restraints' airbag.

In example 7, the subject matter of any one or more of examples 1 to 6, wherein the manacling apparatus comprises: two wrist-restraints, wherein each of the two wrist-restraints is configured to lock the respective elbow of the individual, to which it attaches; and/or two knee-restraints is configured to lock the respective knee of the individual, to which it attaches.

In example 8, the subject matter of example 7 may include, wherein the restraints are configured such that upon operation of the restraints, the elbows and/or knees of the respective individual are automatically locked in a folded position.

In example 9, the subject matter of any one or more of examples 7 to 8 may include, wherein each of the restraints further comprises a controllable inflatable airbag.

In example 10, the subject matter of any one or more of examples 1 to 5 may include, wherein the restraining device of the manacling apparatus comprises:

two restraints;

a connecting strap connecting the two restraints and a strap control mechanism for restricting a length of the strap between the restraints and therefore restricting maximum or minimum length between the individuals limbs, wherein the strap control mechanism is electronically controllable via the processing and control unit.

In example 11, the subject matter of any one or more of examples 1 to 5 may include, wherein the manacling apparatus comprises:

at least one ankle-fetter; and a controllable fetter-connecting mechanism, configured to connect the wrist and ankle fetters to one another such as to control the physical bodily state of the individual by controlling the distance between each of wrist-fetters to each of the ankle-fetter.

In example 12, the subject matter of example 11 may include, wherein the controllable fetter-connecting mechanism comprises:

an upper connecting cable connecting at each edge thereof to a different wrist-fetter;

a lower connecting cable connecting at each edge thereof to a different ankle-fetter;

a harness, configured to be dressed over the individual's torso, the harness comprising one or more channeling loops for directing the upper and/or lower connecting cables therethrough; and a cables-control mechanism for controlling the physical state of the individual by controlling length of the upper and/or lower connecting cables.

In example 13, the subject matter of any one or more of examples 1 to 12 may include, wherein the system is configured to communicate with a central control module, the central control module being configured for receiving in real time or near real time, data from the processing and control module and enable data presentation, data processing modification and/or remote controlling of manacling apparatuses of multiple individuals, each wearing a manacling apparatus.

In example 14, the subject matter of any one or more of claims 1 to 2 may include, wherein the at least one restraining device is configured to releasably prevent or restrain pivotal movement of the individual's limb parts about one or more corresponding limb joints.

In example 15, the subject matter of example 14 may include, wherein the at least one restraining device comprises:

a bracing ring configured to wrap around a part of the individual's shin or forearm;

a footwear or a hand-wear configured to be worn over the individual's foot or hand palm; and a motorized locking mechanism configured for locking the bracing ring and the footwear or hand-wear into a locked position and preventing a movement of one in respect to the other.

In example 16, the subject matter of example 15 may include, wherein the motorized locking mechanism comprises:

a motor;

a power source for powering the motor;

a rotatable element, rotatable by the motor about a rotation axis z; and one or more locking components at least one of the one or more locking components being moveable by the rotatable element, for releasable locking of the bracing ring to the footwear or hand-wear.

In example 17, the subject matter of example 16 may include, wherein the one or more locking components comprise at least:

a cogwheel enagageable with the rotatable element such that once the rotatable element is rotated about the z axis, the cogwheel is rotated thereby about a perpendicular y axis;

one or more pins, each being fixedly connected to the cogwheel such that the pins are rotatable therewith about the same axis y, once the cogwheel is rotated by the rotatable element; and a rigid element fixedly connected to the bracing ring, the rigid element comprises tracks along which the pins are movable, wherein the configuration of each of the tracks is such that a respective pin inserted therein is limited in its span of movement therein.

In example 18, the subject matter of example 16 may include, wherein the one or more locking components comprise at least:

a linear actuator including: the rotatable element and a bolt nut linearly displaced along the z axis by rotation of the rotatable element;

a moveable element having a connector arm and a protrusion connected to one another, the moveable element being pivotally movable about an axis y that is perpendicular to the rotation axis z of the rotatable element by being rotated in response to linear displacement of the nut of the linear actuator; and a ratchet wheel having inclined teeth, the ratchet wheel being enagageable with the protrusion of the moveable element such that once the moveable element is rotated about the y axis, the ratchet wheel is rotated thereby about an axis that may be also parallel to the y axis.

In example 19, the subject matter of example 18 may include, wherein the locking mechanism further comprises a tension mechanism, for maintaining the protrusion of the moveable element in engagement with the ratchet wheel.

Example 20 is a manacling apparatus for controllable restraining movements of an individual wearing the manacling apparatus, the manacling apparatus comprising at least: at least one restraining device, each restraining device comprising one or more controllable components for controllable restraining of the individual.

In example 21, the subject matter of example 20 may include, wherein at least one of the at least one restraining device is configured to restrict or prevent limb joint related pivotal movement of limb parts of the respective limb of the individual.

In example 22, the subject matter of any one or more of examples 20 to 21 may include, wherein each of the at least one restraining device comprises at least one inflatable restraint, each inflatable restraint being wearable over the individual's body part and is controllably inflatable for restriction movement of the respective body part of the individual.

In example 23, the subject matter of any one or more of examples 20 to 22 may include, wherein the manacling apparatus comprises multiple restraining mechanisms, each restraining mechanism being wearable over a different body part of the individual.

In example 24, the subject matter of example 23 may include, wherein the multiple restraining devices are all connected to one another via at least one connecting mechanism.

In example 25, the subject matter of example 24 may include, wherein the at least one connecting mechanism comprises at least one connecting strap connected to all the restraining devices, wherein a length and/or tension of the at least one connecting strap is controllable for controlling posture of the respective individual.

In example 26, the subject matter of any one or more of examples 20 to 25 may include, wherein each restraining device comprises at least:

a bracing ring configured to wrap around a part of the individual's shin or forearm;

a footwear or a hand-wear configured to be worn over the individual's foot or hand palm; and a motorized locking mechanism configured for locking the bracing ring and the footwear or hand-wear into a locked position and preventing a movement of one in respect to the other.

In example 27, the subject matter of example 26 may include, wherein the motorized locking mechanism comprises:

a motor;

a power source for powering the motor;

a rotatable element, rotatable by the motor about a rotation axis z; and one or more locking components at least one of the one or more locking components being moveable by the rotatable element, for releasable locking of the bracing ring to the footwear or hand-wear.

In example 28, the subject matter of example 27 may include, wherein the one or more locking components comprise at least:

a cogwheel enagageable with the rotatable element such that once the rotatable element is rotated about the z axis, the cogwheel is rotated thereby about a perpendicular y axis;

one or more pins, each being fixedly connected to the cogwheel such that the pins are rotatable therewith about the same axis y, once the cogwheel is rotated by the rotatable element; and a rigid element fixedly connected to the bracing ring, the rigid element comprises tracks along which the pins are movable, wherein the configuration of each of the tracks is such that a respective pin inserted therein is limited in its span of movement therein.

In example 29, the subject matter of example 27 may include, wherein the one or more locking components comprise at least:

a linear actuator including: the rotatable element and a bolt nut linearly displaced along the z axis by rotation of the rotatable element;

a moveable element having a connector arm and a protrusion connected to one another, the moveable element being pivotally movable about an axis y that is perpendicular to the rotation axis z of the rotatable element by being rotated in response to linear displacement of the nut of the linear actuator; and a ratchet wheel having inclined teeth, the ratchet wheel being enagageable with the protrusion of the moveable element such that once the moveable element is rotated about the y axis, the ratchet wheel is rotated thereby about an axis that may be also parallel to the y axis.

In example 30, the subject matter of example 29 may include, wherein the locking mechanism further comprises a tension mechanism, for maintaining the protrusion of the moveable element in engagement with the ratchet wheel.

In example 31, the subject matter of any one or more of examples 20 to 30 may include, wherein the manacling apparatus further comprises at least one sensor, configured to detect at least one physical characteristics of an individual, wherein a processing and control module, located as part of the manacling apparatus of as a separate device, is configured to receive sensor data from the at least one sensor, analyze the received sensor data to determine whether restraining of the individual is required and control each of the at least one restraining device of the manacling apparatus, for physical restraining of the e individual, based on analysis results.

Although the above description discloses a limited number of exemplary embodiments of the invention, these embodiments should not apply any limitation to the scope of the invention, but rather be considered as exemplifications of some of the manners in which the invention can be implemented.

The method and/or processes described herein may be implemented by any one or more software, and/or hardware, element apparatus, device, mechanism, electronic and/or digital computerized system, unit, processing module, device, machine, engine, etc.

The system, module, unit, device etc. or parts thereof, may be programmed to perform particular functions pursuant to computer readable and executable instructions, rules, conditions etc. from programmable hardware and/or software based execution modules that may implement one or more methods or processes disclosed herein, and therefore can, in effect, be considered as disclosing a "special purpose computer" particular to embodiments of each disclosed method/process.

Additionally or alternatively, the methods and/or processes disclosed herein may be implemented as a computer program that may be tangibly or intangibly embodied by a special purpose computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer or machine-readable storage device and that can communicate, propagate, or transport a program for use by or in connection with apparatuses, systems, platforms, methods, operations and/or processes discussed herein.

The terms "non-transitory computer-readable storage device" and "non-transitory machine-readable storage device" may also include distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by one or more communication networks.

The computer readable and executable instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

A module, a device, a mechanism, a unit and or a subsystem may each comprise a machine or machines executable instructions (e.g. commands). A module may be embodied by a circuit or a controller programmed to cause the system to implement the method, process and/or operation as disclosed herein. For example, a module may be implemented as a hardware circuit comprising, e.g., custom very large-scale integration (VLSI) circuits or gate arrays, an Application-specific integrated circuit (ASIC), off-the-shelf semiconductors such as logic chips, transistors, and/or other discrete components. A module may also be implemented in programmable hardware devices such as field programmable gate arrays, programmable array logic, programmable logic devices and/or the like.

In the above disclosure, unless otherwise stated, terms such as "substantially", "about", approximately, etc., that specify a condition or relationship characterizing a feature or features of an embodiment of the invention, are to be understood to mean that the condition or characteristic is defined to within tolerances that are acceptable for operation of the embodiment for an application for which it is intended.

It is important to note that the methods/processes and/or systems/devices/subsystems/apparatuses etc., disclosed in the above Specification, are not to be limited strictly to flowcharts and/or diagrams provided in the Drawings. For example, a method may include additional or fewer processes or steps in comparison to what is described in the figures. In addition, embodiments of the method are not necessarily limited to the chronological order as illustrated and described herein.

The invention claimed is:

1. A system for monitoring and restraining at least one individual, the system comprising:

(i) at least one manacling apparatus, each manacling apparatus comprising at least one restraining device, configured to be worn by the individual and to restrain movement of an individual:

(ii) at least one sensor, configured to detect at least one physical characteristics of an individual; and (iii) a processing and control module, configured to receive sensor data from the at least one sensor of each manacling apparatus, analyze the received sensor data to determine whether restraining of the respective individual is required and control each of the at least one restraining device of the manacling apparatus of the respective individual, for physical restraining of the respective individual, based on analysis results, wherein the at least one restraining device is configured to releasably restrain pivotal movement of the individual's limb parts about a corresponding limb joint, wherein the at least one restraining device comprises:

a bracing ring configured to wrap around a part of the individual's shin or forearm;

a footwear or a hand-wear configured to be worn over the individual's foot or hand palm; and a motorized locking mechanism configured for locking the bracing ring and the footwear or hand-wear into a locked position and preventing a movement of one in respect to the other, wherein the motorized locking mechanism comprises:

a motor;

a power source for powering the motor;

a rotatable element, rotatable by the motor about a rotation axis z; and one or more locking components at least one of the one or more locking components being moveable by the rotatable element, for releasable locking of the bracing ring to the footwear or hand-wear, wherein the one or more locking components comprise at least:

a cogwheel enagageable with the rotatable element such that once the rotatable element is rotated about the z axis, the cogwheel is rotated thereby about a perpendicular y axis;

one or more pins, each being fixedly connected to the cogwheel such that the pins are rotatable therewith about the same axis y, once the cogwheel is rotated by the rotatable element; and a rigid element fixedly connected to the bracing ring, the rigid element comprises tracks along which the pins are movable, wherein the configuration of each of the tracks is such that a respective pin inserted therein is limited in its span of movement therein.

2. The system of claim 1, wherein the processing and control module is embedded in the manacling apparatus and configured for automatic analysis of the sensor data and automatic responding to the analysis results.

3. The system of claims 1, wherein the processing and control module is remotely located from the manacling apparatus, wherein the processing and control module comprises a communication module for communication with the manacling apparatus and wherein the manacling apparatus further comprises an embedded communication module for communicating with the processing and control module.

4. The system of claim 1, wherein the at least one sensor comprises one or more of: a positioning device, an accelerometer, a pressure sensor, a compass, an optical detector, a gyroscope device, pulse or heartbeat detector, blood pressure detector, microphone, camera.

5. The system of claim 1, wherein the restraining device of the manacling apparatus comprises at least two restraints configured for restraining limb joints of the individual to which each of the restraints is attached.

6. The system of claim 5, wherein each of the restraints comprises an inflatable airbag configured such that the limb-joint restraining is done by inflation of each of the restraints' airbag.

7. The system of claim 1, wherein the manacling apparatus comprises:

two wrist-restraints, wherein each of the two wrist-restraints is configured to lock the respective elbow of the individual, to which it attaches; and/or two knee-restraints is configured to lock the respective knee of the individual, to which it attaches.

8. The system of claim 7, wherein operation of the restraints is controllable by the processing and control module and wherein the restraints are configured such that upon operation of the restraints, the elbows and/or knees of the respective individual are automatically locked in a folded position.

9. The system of claim 7, wherein each of the restraints further comprises a controllable inflatable airbag.

10. The system of claim 1, wherein the manacling apparatus comprises:

at least one wrist-fetter;

at least one ankle-fetter; and a controllable fetter-connecting mechanism, configured to connect the wrist and ankle fetters to one another such as to control the physical bodily state of the individual by controlling the distance between each of wrist-fetters to each of the ankle-fetter.

11. A system for monitoring and restraining at least one individual, the system comprising:

(i) at least one manacling apparatus, each manacling apparatus comprising at least one restraining device, configured to be worn by the individual and to restrain movement of an individual:

(ii) at least one sensor, configured to detect at least one physical characteristics of an individual; and (iii) a processing and control module, configured to receive sensor data from the at least one sensor of each manacling apparatus, analyze the received sensor data to determine whether restraining of the respective individual is required and control each of the at least one restraining device of the manacling apparatus of the respective individual, for physical restraining of the respective individual, based on analysis results, wherein the at least one restraining device is configured to releasably restrain pivotal movement of the individual's limb parts about a corresponding limb joint, wherein the at least one restraining device comprises:

a bracing ring configured to wrap around a part of the individual's shin or forearm;

a footwear or a hand-wear configured to be worn over the individual's foot or hand palm; and a motorized locking mechanism configured for locking the bracing ring and the footwear or hand-wear into a locked position and preventing a movement of one in respect to the other, wherein the motorized locking mechanism comprises:

a motor;

a power source for powering the motor;

a rotatable element, rotatable by the motor about a rotation axis z; and one or more locking components at least one of the one or more locking components being moveable by the rotatable element, for releasable locking of the bracing ring to the footwear or hand-wear, wherein the one or more locking components comprise at least:

a linear actuator including: the rotatable element and a bolt nut linearly displaced along the z axis by rotation of the rotatable element;

a moveable element having a connector arm and a protrusion connected to one another, the moveable element being pivotally movable about an axis y that is perpendicular to the rotation axis z of the rotatable element by being rotated in response to linear displacement of the nut of the linear actuator; and a ratchet wheel having inclined teeth, the ratchet wheel being enagageable with the protrusion of the moveable element such that once the moveable element is rotated about the y axis, the ratchet wheel is rotated thereby about an axis that may be also parallel to the y axis.

12. The system of claim 11, wherein the locking mechanism further comprises a tension mechanism, for maintaining the protrusion of the moveable element in engagement with the ratchet wheel.

13. The system of claim 11, wherein the processing and control module is embedded in the manacling apparatus and configured for automatic analysis of the sensor data and automatic responding to the analysis results.

14. The system of claims 11, wherein the processing and control module is remotely located from the manacling apparatus, wherein the processing and control module comprises a communication module for communication with the manacling apparatus and wherein the manacling apparatus further comprises an embedded communication module for communicating with the processing and control module.

15. The system of claim 11, wherein the at least one sensor comprises one or more of: a positioning device, an accelerometer, a pressure sensor, a compass, an optical detector, a gyroscope device, pulse or heartbeat detector, blood pressure detector, microphone, camera.

16. The system of claim 11, wherein the restraining device of the manacling apparatus comprises at least two restraints configured for restraining limb joints of the individual to which each of the restraints is attached.

17. The system of claim 16, wherein each of the restraints comprises an inflatable airbag configured such that the limb-joint restraining is done by inflation of each of the restraints' airbag.

18. The system of claim 11, wherein the manacling apparatus comprises:

two wrist-restraints, wherein each of the two wrist-restraints is configured to lock the respective elbow of the individual, to which it attaches; and/or two knee-restraints is configured to lock the respective knee of the individual, to which it attaches.

19. The system of claim 18, wherein operation of the restraints is controllable by the processing and control module and wherein the restraints are configured such that upon operation of the restraints, the elbows and/or knees of the respective individual are automatically locked in a folded position.

20. The system of claim 11, wherein the manacling apparatus comprises:

at least one wrist-fetter;

at least one ankle-fetter; and a controllable fetter-connecting mechanism, configured to connect the wrist and ankle fetters to one another such as to control the physical bodily state of the individual by controlling the distance between each of wrist-fetters to each of the ankle-fetter.

* * * * *